United States Patent
Urry et al.

(10) Patent No.: US 10,027,277 B2
(45) Date of Patent: Jul. 17, 2018

(54) SHORT-STRING PARALLEL-DC OPTIMIZER FOR PHOTOVOLTAIC SYSTEMS

(71) Applicant: Zyntony, Inc., Sandy, UT (US)

(72) Inventors: Robin Urry, Draper, UT (US); Roger Johnsen, Holladay, UT (US)

(73) Assignee: Zyntony, Inc., Sandy, UT (US)

( * ) Notice: Subject to any disclaimer, the term of this patent is extended or adjusted under 35 U.S.C. 154(b) by 216 days.

(21) Appl. No.: 14/668,668

(22) Filed: Mar. 25, 2015

(65) Prior Publication Data
US 2016/0285264 A1    Sep. 29, 2016

(51) Int. Cl.
*H02J 1/00*     (2006.01)
*H02S 40/34*   (2014.01)
*H02S 40/36*   (2014.01)
*H02S 40/32*   (2014.01)
*H02J 3/38*    (2006.01)

(52) U.S. Cl.
CPC ............. *H02S 40/34* (2014.12); *H02J 3/383* (2013.01); *H02J 3/385* (2013.01); *H02S 40/32* (2014.12); *H02S 40/36* (2014.12); *Y02B 10/30* (2013.01); *Y02B 10/70* (2013.01); *Y02E 10/563* (2013.01); *Y02E 10/58* (2013.01); *Y02E 10/725* (2013.01)

(58) Field of Classification Search
CPC .......... H02S 40/36; H02S 40/32; H02S 40/34; H02J 3/385; H02J 3/383
USPC .......................................................... 307/82
See application file for complete search history.

(56) References Cited

U.S. PATENT DOCUMENTS

| | | | |
|---|---|---|---|
| 7,443,052 B2 | 10/2008 | Wendt | |
| 8,013,472 B2 * | 9/2011 | Adest | H02J 3/385 307/77 |
| 8,044,538 B2 | 10/2011 | Ragonese | |
| 8,581,441 B2 | 11/2013 | Rotzoll | |
| 8,829,715 B2 | 9/2014 | Agamy | |
| 2007/0164612 A1 * | 7/2007 | Wendt | H02J 1/10 307/45 |
| 2009/0179500 A1 * | 7/2009 | Ragonese | H02J 1/10 307/82 |
| 2010/0043781 A1 * | 2/2010 | Jones | F24J 2/5237 126/704 |
| 2011/0138711 A1 * | 6/2011 | Seng | F24J 2/5207 52/173.3 |
| 2012/0068543 A1 | 3/2012 | Caraglio | |
| 2014/0306540 A1 * | 10/2014 | Wu | H02J 3/385 307/77 |
| 2014/0306542 A1 * | 10/2014 | Williams | H02J 3/385 307/80 |
| 2015/0288188 A1 * | 10/2015 | Keshner | H01L 31/02021 307/52 |

* cited by examiner

*Primary Examiner* — Jared Fureman
*Assistant Examiner* — Duc M Pham
(74) *Attorney, Agent, or Firm* — Travis R. Banta; TechLaw Ventures, PLLC (57) ABSTRACT

This disclosure generally relates to an energy generation system. In one embodiment, the energy generation system comprises a plurality of solar panels that are connected in a series electrical connection. The energy generation system further includes a short-string optimizer which outputs direct current electricity to a direct current bus.

12 Claims, 8 Drawing Sheets

SHORT-STRING PARALLEL-DC OPTIMIZER FOR PHOTOVOLTAIC SYSTEMS

BACKGROUND

1. Technical Field

This disclosure relates generally to optimized photovoltaic systems. More specifically, the system disclosed herein relates to optimizing a short-string of photovoltaic panels to produce a consistent, reliable, and efficient source of power on residential rooftops.

2. Description of the Related Art

Photovoltaic systems convert solar energy into direct current electricity. A simple photovoltaic system may include a solar panel and a power inverter. As the solar panel in the simple photovoltaic system absorbs solar energy, the solar panel creates direct current electricity. The solar panel is typically connected to a power inverter to convert the direct current electricity into alternating current electricity to power electrical devices.

Conventional photovoltaic systems have several drawbacks. First, conventional photovoltaic systems require that each solar panel in a string of solar panels maintain the same azimuth. For example, in the United States, each solar panel in a string of solar panels should face south to absorb the maximum amount of solar energy available. However, on a residential rooftop, for example, space on south facing portions of a roof may be limited such that a homeowner cannot install a meaningful number of solar panels on a rooftop. For example, a rooftop on a residential home may be constructed with a hip roof (or a variant thereof), gables, or other vertical sides that prevent installation of one or more solar panels on a south facing portion of a rooftop. Homeowners with rooftops that limit solar panel installation on the desired azimuth are unable to efficiently take advantage of conventional photovoltaic technology.

In addition to maintaining a desired azimuth for solar panels in a photovoltaic system, the solar panels in such a system should further be installed at the same elevation angle relative to each other and the sun. Solar panels in photovoltaic systems generate direct current electricity in proportion to the amount of solar energy absorbed through the solar panels. In other words, a solar panel that is situated at an ideal angle to absorb solar energy will produce more direct current electricity than a solar panel that is situated at a non-ideal angle to absorb solar energy.

Such a configuration can be problematic in practice for two reasons. First, in many residential (and other) situations, it is difficult in practice to install every solar panel in a photovoltaic system at a consistent angle relative to every other solar panel and relative to the sun. Second, rooftop conditions on, for example, a residential rooftop may limit the available space for solar panels in a photovoltaic system to be installed at a consistent azimuth angle and elevation angle. For example, many residential roofs have a "split pitch" in which one section of roof has one pitch and another section of roof has another pitch. In other words, one section of roof on a residential house may be more or less steep than another section of roof on the residential house. In many cases, the varying steepness of a residential rooftop prevents multiple solar panels from being installed at a consistent elevation angle relative to the sun and at an angle that is consistent with other solar panels in the photovoltaic system. In some conventional technologies, power generation is limited by solar panels that cannot be placed at a consistent azimuth angle and elevation angle. In such technologies, each solar panel in a photovoltaic system generates power at the same level as the lowest level of power generated by a particular solar panel. In other words, if one solar panel generates less power because the solar panel is sub-optimally placed at an azimuth angle or an elevation angle that differs from other solar panels to which the sub-optimally placed solar panel is connected, every other solar panel, even if optimally situated, is limited in power production to the same level as the one sub-optimally situated solar panel. Accordingly, in some conventional technologies, a single sub-optimally situated solar panel can lower the power generation abilities of a photovoltaic system as a whole by reducing the power generation of every other solar panel in the photovoltaic system. Such a configuration limits the overall power that can be generated by the photovoltaic system and reduces the efficiency of the photovoltaic system.

Yet another drawback of conventional photovoltaic systems results from local shading on one or more solar panels in the photovoltaic system. For example, at least portions of residential rooftops may be shaded by vent stand pipes, satellite dishes, trees, chimneys, vent caps, television antennas, air conditioners, swamp coolers, other buildings, billboards, power poles, power lines, dirt, dust, and a number of other solar obstructions. In an exemplary photovoltaic system configuration, a large tree may fully or partially shade a portion of a roof throughout an afternoon. Because of the solar obstruction, a solar panel that is fully or partially shaded by the large tree would produce less direct current electricity than a solar panel that is not shaded. A photovoltaic system that has one or more solar panels in a string of solar panels that is fully or partially shaded drops the energy production level of the photovoltaic system to the level of power generation of the lowest performing solar panel. In other words, when one solar panel in a string of solar panels is shaded by a solar obstruction, power generation level for the entire string of solar panels is essentially the same as the power generation level of the single shaded solar panel.

Accordingly, because, for example, residential rooftops are relatively small, the available space for photovoltaic systems must be used efficiently to maximize power generation. Furthermore, for conventional photovoltaic systems, because every solar panel in the photovoltaic system should be positioned on a consistent azimuth, at a consistent elevation angle relative to each of the other solar panels in the system and the sun, and in an unshaded portion of a rooftop, conventional photovoltaic systems cannot efficiently take advantage of available space on a residential rooftop.

Figure 1:
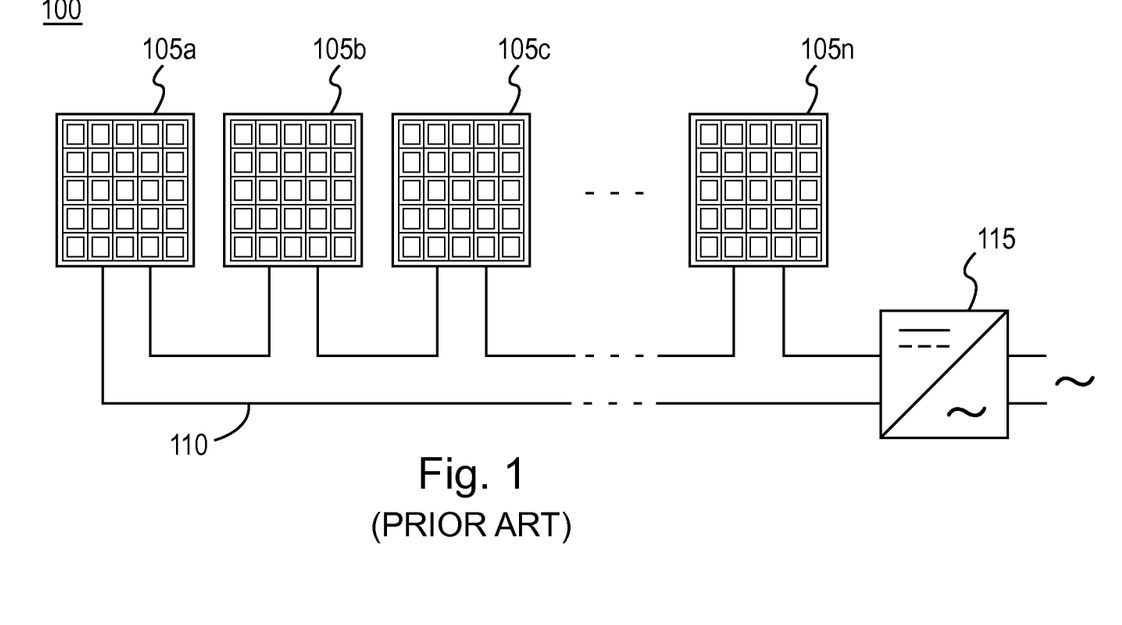
FIG. 1 illustrates a traditional string topology for a photovoltaic system.

For example, FIG. 1 shows an implementation of photovoltaic system 100 that uses a traditional string topology. In this example, solar panels 105a, 105b, 105c to 105n (n solar panels) are connected to each other in a series electrical connection 110 and to string inverter 115. Because of the series electrical connection 110, if one of the solar panels is compromised by technical malfunction, change in azimuth, difference in elevation angle, or a solar obstruction, the entire string of solar panels 105a-105n is compromised. Similarly, a "solar panel mismatch" caused by manufacturing differences between solar panels, mixed types of solar panels, temperatures, and other issues can cause the string of solar panels in photovoltaic system 100 to operate at less than the desirable level. Thus, in addition to being prone to inefficient operation, traditional string topologies, such as photovoltaic system 100, are not ideal for residential use because residential rooftops, for example, have limited available space where a desirable and consistent azimuth angle and a consistent elevation angle can be obtained in an unshaded area of a residential rooftop.

Figure 2:
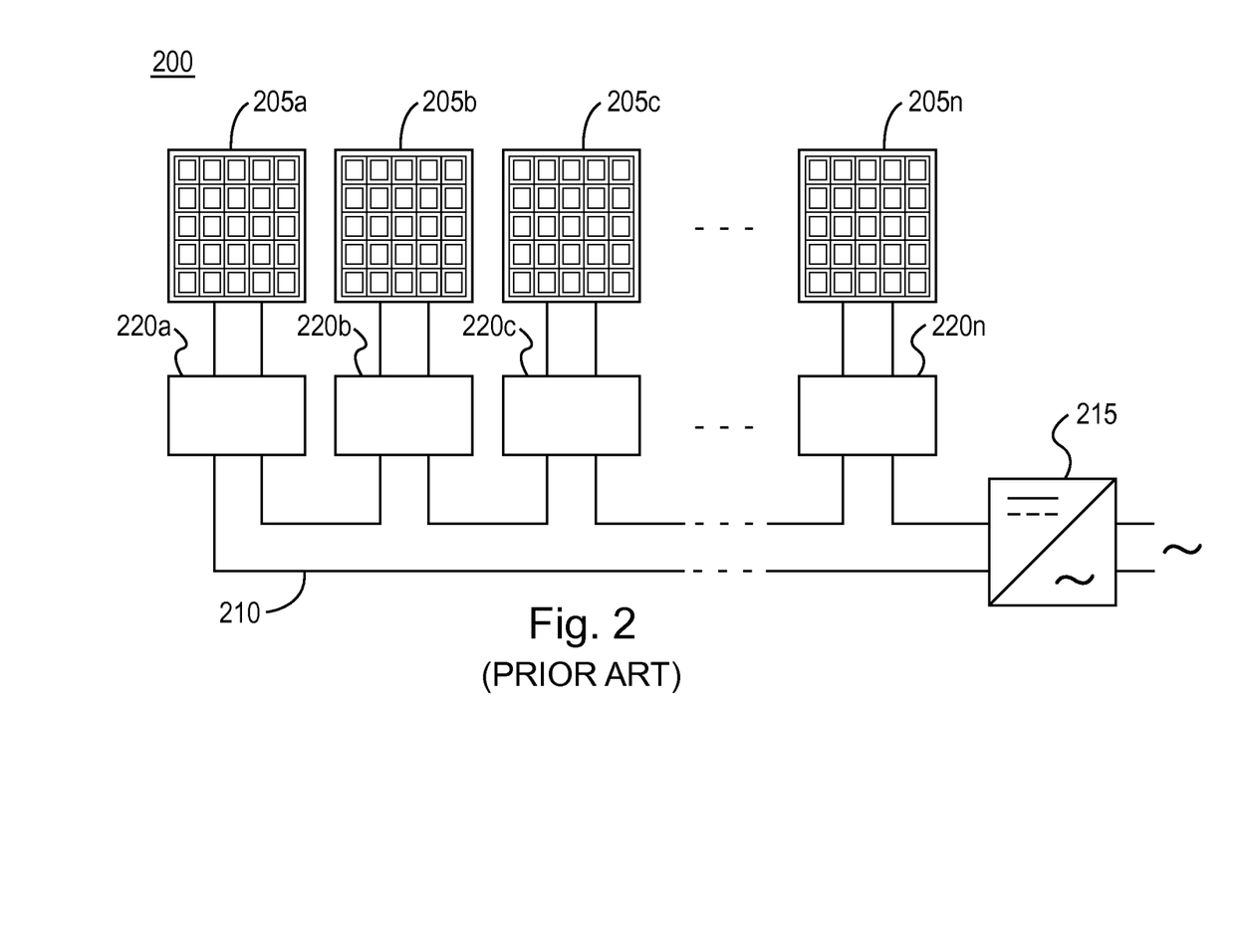
FIG. 2 illustrates an optimized string topology for a photovoltaic system.

FIG. 2 shows an implementation of photovoltaic system 200 using an optimized string topology. In this example, each of solar panels 205a, 205b, 205c to 205n (n solar panels) is directly connected to a respective one of maximum power point converters 220a, 220b, 220c to 220n (n maximum power point converters). Each of maximum power point converters 220a-220n is connected in a series electrical connection 210 to a string inverter 215. Essentially, conventional photovoltaic system 200 improves on conventional photovoltaic system 100 shown in FIG. 1 by providing maximum power point converters 220a-220n that monitor a maximum power point for their respective solar panel 205a-205n. In this way, maximum power point converters 220a-220n each independently adjust the current through a respective solar panel to maximize the power harvested from a respective solar panel, providing the available direct current electricity to string inverter 215, thus maximizing the electrical power available in photovoltaic system 200. For example, assume photovoltaic system 200 is installed on a residential rooftop. Solar panels 205a-205n absorb solar energy and produce direct current electricity which is conducted to their respective maximum power point converters 220a-220n. However, just after noon, a chimney begins to cast a shade on solar panel 205a. Maximum power point converter 220a, recognizes that the direct current electricity supplied by solar panel 205a is reduced because of the solar obstruction and independently adjusts its own operating characteristics to correspond with a shaded operating condition. Thus, unlike photovoltaic system 100, shown in FIG. 1, in which all solar panels' energy production would be compromised by the reduced output of solar panel 205a, photovoltaic system 200 operates more efficiently (than photovoltaic system 100 shown in FIG. 1). This is because the energy output of each of solar panels 205a-205n in photovoltaic system 200 is independently maximized on a per-panel basis by maximum power point converters 220a-220n.

While photovoltaic system 200 is an improvement on photovoltaic system 100 shown in FIG. 1, photovoltaic system 200 introduces many more devices (maximum power point converters 220a-220n), each of which bring an additional capacity to fail and increase the financial cost of photovoltaic system 200 because for every new solar panel incorporated into a homeowner's system, the homeowner must also purchase an additional module to manage the new solar panel. Furthermore, even though photovoltaic system 200 includes maximum power point converters 220a-220n, photovoltaic system 200 still uses series electrical connection 210. Therefore, a failure of any of maximum power point converters 220a-220n, or any failure in electrical continuity along the string, would result in failure of that entire string to produce energy.

Figure 3:
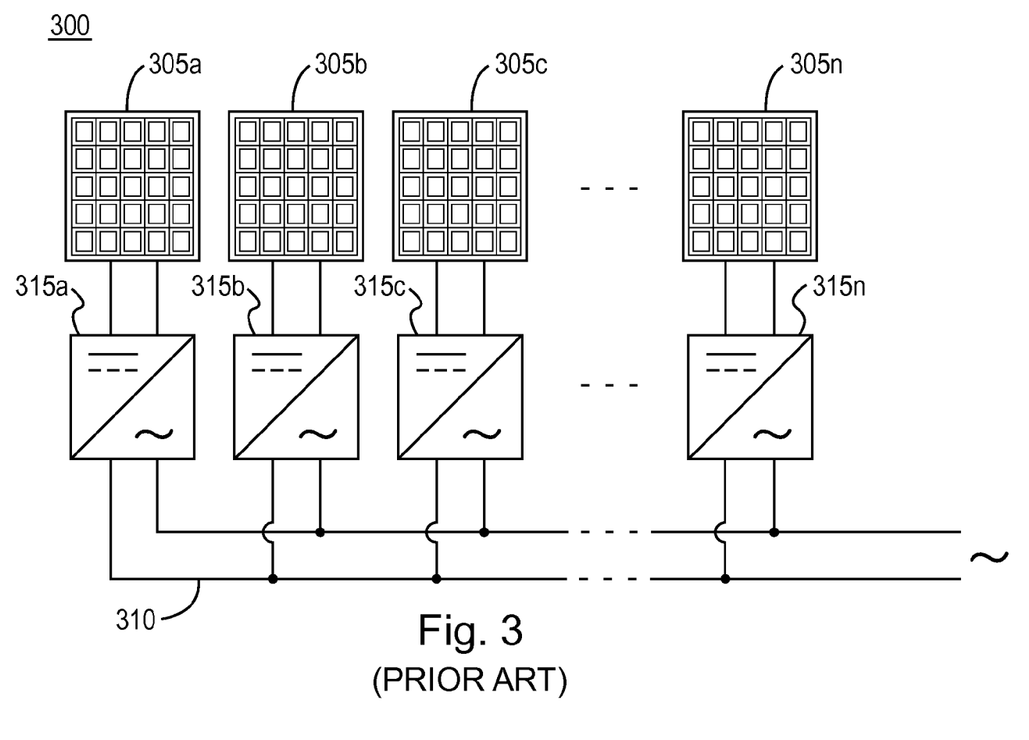
FIG. 3 illustrates a microinverter topology for a photovoltaic system.

FIG. 3 shows an implementation of photovoltaic system 300 using conventional microinverter topology. In this example, each of solar panels 305a, 305b, 305c to 305n (n solar panels) is directly connected to a respective one of microinverters 315a, 315b, 315c to 315n (n microinverters). Each of microinverters 315a-315n in photovoltaic system 300 is connected in a parallel electrical connection as opposed to the series electrical connection described above with photovoltaic systems 100 and 200. Microinverters 315a-315n are configured to receive direct current electricity from solar panels 305a-305n and invert the direct current electricity to create alternating current electricity. Microinverters 315a-315n therefore output alternating current electricity into an alternating current bus ("AC bus") 310. Microinverters 315a-315n may also monitor a maximum power point for a respective solar panel 305a-305n in order to maximize the electrical power available in photovoltaic system 300.

Photovoltaic system 300 enjoys at least one advantage over photovoltaic systems 100 and 200, described above with respect to FIGS. 1 and 2. Specifically, since photovoltaic system 300 is configured with each of solar panels 305a-305n and a respective each of microinverters 315a-315n in a parallel electrical connection, a failure in one of solar panels 305a-305n or microinverters 315a-315n will not compromise the electrical output of the entire system, unlike photovoltaic systems 100 and 200 described above with respect to FIGS. 1 and 2. At the same time, however, the use of microinverters 315a-315n requires that every solar panel in photovoltaic system 300 also directly connect to a microinverter. Thus, the financial cost of photovoltaic system 300 is much greater because a homeowner must buy a microinverter for each solar panel the homeowner intends to use. Furthermore, as in system 200, each additional microinverter that is included in photovoltaic system 300 provides an additional point of failure which is a particular concern given that microinverters 315a-315n contain electrical elements that are particularly susceptible to the extreme weather conditions that can be experienced on a rooftop. More specifically, because microinverters 315a-315n are used to invert direct current electricity to create alternating current electricity, they frequently contain electrolytic capacitors that can be sensitive to temperature, humidity, water, and other weather conditions that can be experienced on a rooftop. Microinverters 315a-315n are also complex, requiring more electrical components (than maximum power point converters 220a-220n of photovoltaic system 200, shown in FIG. 2) making microinverters 315a-315n more expensive in terms of equipment costs and less reliable, due to the large number of electrical components exposed to harsh conditions. Also, in attempting to prevent excessive reliability problems, these components must typically be specified as higher-grade versions able to withstand wider temperature extremes, which significantly increases costs. Thus, while the consequences of one of solar panels 305a-305n or corresponding microinverters 315a-315n failing are reduced by the parallel electrical connection of photovoltaic system 300, the need to supply a microinverter with every solar panel increases the number of devices in photovoltaic system 300 that can fail and affect system reliability, as compared with photovoltaic system 100. Photovoltaic system 300 is also more expensive, more complex, and more subject to reliability problems than photovoltaic system 200.

Microinverter technology in photovoltaic system 300 suffers from another drawback. As discussed above, each of microinverters 315a-315n invert direct current electricity supplied by solar panels 305a-305n into alternating current electricity. In the configuration described as photovoltaic system 300, this inversion of direct current electricity into alternating current electricity is inefficient for two reasons. First, because the direct current electricity output by solar panels 305a-305n is relatively low, each of microinverters 315a-315n must increase the voltage before the direct current electricity can be converted into alternating current electricity that is usable in an electrical device. However, because each voltage increase and waveform conversion is subject to inherent inefficiencies, microinverters 315a-315n introduce electrical losses into photovoltaic system 300. Second, the inherent inefficiencies of increasing voltage and converting direct current into alternating current are compounded in photovoltaic system 300 because each of microinverters 315a-315n is individually increasing voltage and converting the waveform independently of every other microinverter in photovoltaic system 300. Thus, less efficient inversions are performed by each of microinverters 315a-315n which are aggregated in the configuration of photovoltaic system 300. In other words, many small inefficient inversions performed by the microinverters 315a-315n sum to a total energy loss for photovoltaic system 300 that, on the whole, would be larger than the loss experienced by photovoltaic system 300 if a single inversion was to be performed on the aggregated current from the solar panels in a centralized inverter, such as in system 100.

Figure 4:
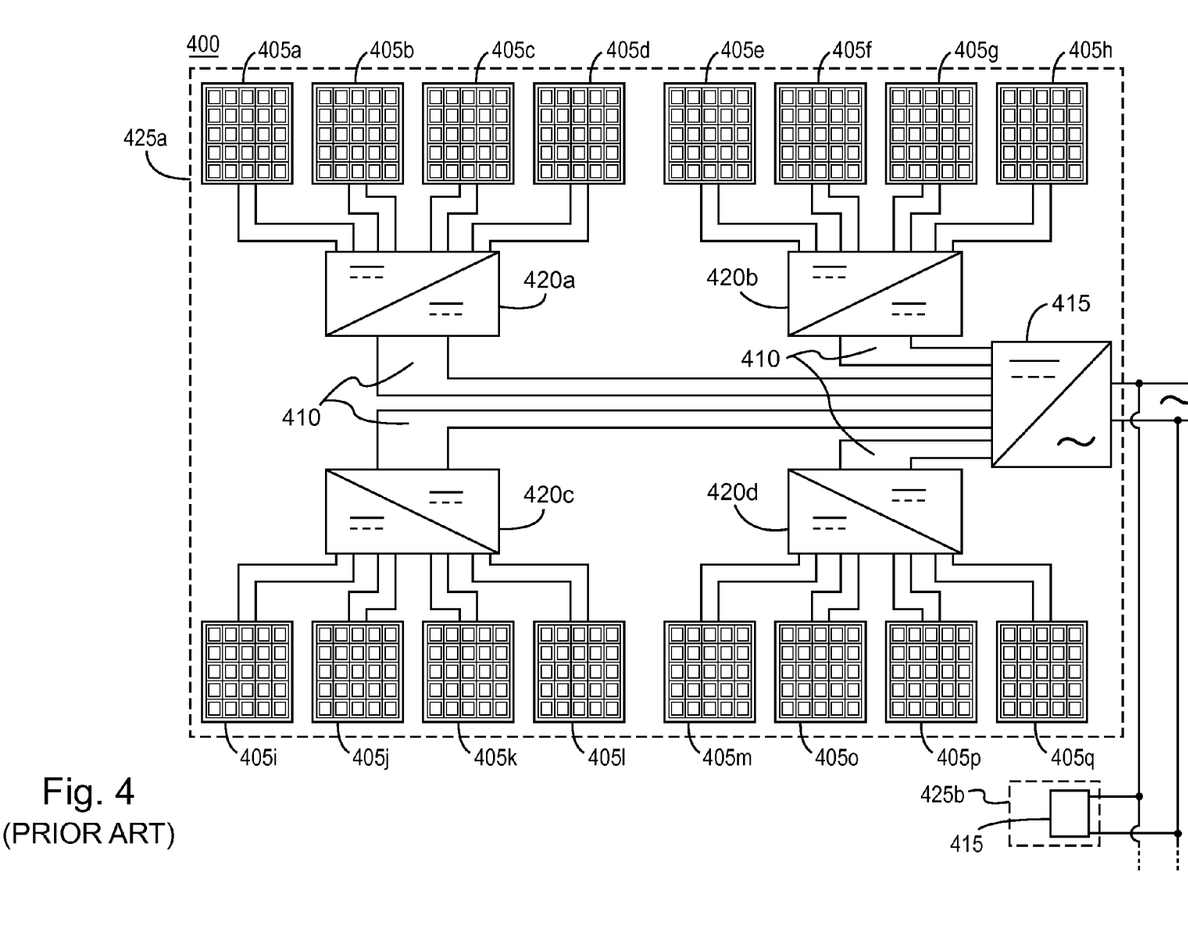
FIG. 4 illustrates a mini-inverter topology for a photovoltaic system.

FIG. 4 shows an implementation of photovoltaic system 400 using a conventional mini-inverter topology. In solar block 425a, each of solar panels 405a, 405b, 405c, and 405d is directly connected to boost converter 420a by DC electrical connections, as shown in FIG. 4. Similarly, solar panels 405e, 405f, 405g, and 405h are directly connected to boost converter 420b; solar panels 405i, 405j, 405k, and 405l are directly connected to boost converter 420c; and solar panels 405m, 405o, 405p, and 405q are directly connected to boost converter 420d. Each of boost converters 420a, 420b, 420c, and 420d is directly connected to a mini-inverter 415 via DC electrical connections 410. Photovoltaic system 400 may, to scale up the energy production of photovoltaic system 400, optionally add additional solar blocks such as solar block 425b, which are identical in topology and layout to solar block 425a, and connected in parallel to solar block 425a, as needed to suit a particular implementation.

Boost converters 420a-420d are similar to maximum power point converters 220a-220n shown in FIG. 2 and discussed above, except that each of boost converters 420a-420d have four maximum power point functions to monitor the maximum power independently per solar panel for four solar panels at the same time. This is an improvement over photovoltaic system 200 shown in FIG. 2, because photovoltaic system 400 uses fewer boost converters 420a-420d, and therefore has fewer points of failure in that portion of photovoltaic system 400 and has a lower overall complexity and potentially lower cost. However, photovoltaic system 400 is at a disadvantage when compared with photovoltaic system 200 in that photovoltaic system 400 increases the number of inverters needed, meaning the number of string inverters 215 in system 200, versus the number of mini-inverters 415 in system 400, for photovoltaic systems that include more than sixteen solar panels and, therefore, increases the overall system complexity and the number of failure points in that portion of photovoltaic system 400. Also, even though photovoltaic system 400 has fewer boost converters 420a-420d, photovoltaic system 400 still requires the same number of input connections from solar panels as in photovoltaic systems 200 and 300. Further, similar to system 300, the intended design of system 400 requires the mini-inverter to be located on the roof in that harsher environment, making it similarly susceptible to reliability issues.

It is therefore one object of this disclosure to provide a photovoltaic system that has the flexibility to minimize necessary electrical circuitry while, at the same time maximizing power generation in a specific area. It is a further object of this disclosure to take advantage of similar solar conditions in a particular area of a rooftop by co-locating a short-string of solar panels on a rooftop such that each solar panel in the short string shares a consistent azimuth angle and a consistent elevation angle.

It is a further object of this disclosure to provide a photovoltaic system that reduces system costs and has fewer points of failure than at least some other systems, is not incapacitated by a single point of failure, and that efficiently uses solar energy to create electrical power.

SUMMARY

Consistent with embodiments disclosed herein, a system is disclosed. The system includes a plurality of solar panels that are connected in a series electrical connection. The system further includes a short-string optimizer that outputs direct current electricity to a direct current bus.

In another implementation, a system is disclosed that includes a first plurality of solar panels. The first plurality of solar panels are connected in a series electrical connection and to a first short-string optimizer. The system further includes a second plurality of solar panels. The second plurality of solar panels are connected in a series electrical connection and to a second short-string optimizer. The first short-string optimizer and the second short-string optimizer are further connected in a parallel electrical connection via a direct current bus.

Also disclosed is a system that includes a plurality of power generators that are connected in a series electrical connection. The system further includes a short-string optimizer. The short-string optimizer outputs direct current electricity to a direct current bus.

BRIEF DESCRIPTION OF THE DRAWINGS

The accompanying drawings illustrate several embodiments of the short-string parallel DC optimizer for photovoltaic systems and constitute a part of the specification. The illustrated embodiments are exemplary and do not limit the scope of the disclosure.

DETAILED DESCRIPTION OF PREFERRED EMBODIMENTS

In the following description, for purposes of explanation and not limitation, specific techniques and embodiments are set forth, such as particular techniques and configurations, in order to provide a thorough understanding of the device disclosed herein. While the techniques and embodiments will primarily be described in context with the accompanying drawings, those skilled in the art will further appreciate that the techniques and embodiments may also be practiced in other similar devices.

Reference will now be made in detail to the exemplary embodiments, examples of which are illustrated in the accompanying drawings. Wherever possible, the same reference numbers are used throughout the drawings to refer to the same or like parts. It is further noted that elements disclosed with respect to particular embodiments are not restricted to only those embodiments in which they are described. For example, an element described in reference to one embodiment or figure, may be alternatively included in another embodiment or figure regardless of whether or not those elements are shown or described in another embodiment or figure. In other words, elements in the figures may be interchangeable between various embodiments disclosed herein, whether shown or not.

Figure 5:
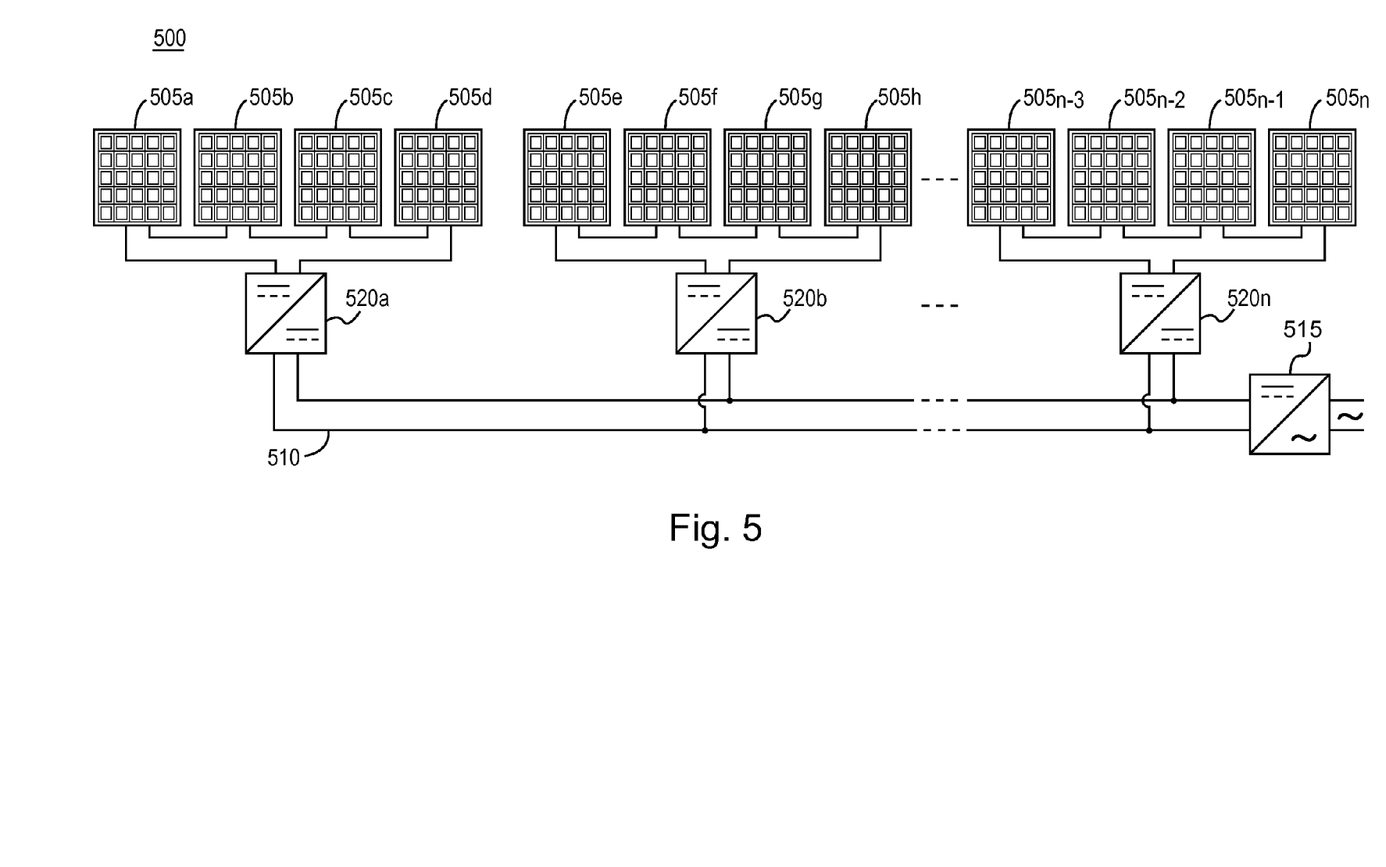
FIG. 5 illustrates an optimized short-string topology photovoltaic system.

FIG. 5 illustrates an exemplary optimized short-string topology photovoltaic system 500. Photovoltaic system 500 includes a plurality of solar panels 505a, 505b, 505c, 505d, 505e, 505f, 505g. 505h, 505n-3, 505n-2, 505n-1, and 505n. Solar panels 505a-505n are organized into n short-strings of four solar panels each. Although twelve solar panels and three short-strings are shown in FIG. 5 for convenience of explanation (four solar panels per short-string), photovoltaic system 500 could implement any number of solar panels and any number of short-strings including more or fewer than what is shown in FIG. 5. A short-string is defined herein as meaning a string of between two and four solar panels connected in a series electrical connection.

In the example of FIG. 5, solar panels 505a-505d are connected to each other and to short-string optimizer 520a in a series electrical connection. Solar panels 505e-505h are shown in photovoltaic system 500 as being connected in a series electrical connection to each other and to short-string optimizer 520b. Additional short-strings can be similarly implemented up to n short-strings as shown with solar panels 505n-3-505n also being connected in a series electrical connection to each other and to short-string optimizer 520n. Each of the n short-string optimizers 520a-520n in photovoltaic system 500 is connected to direct current bus 510 in a parallel electrical connection. An inverter 515 is installed on direct current bus 510. Inverter 515 may be implemented singly, as shown in FIG. 5, or in a parallel electrical connection with a plurality of inverters, depending on the desired magnitude of alternating current power output.

Photovoltaic system 500 provides several advantages over conventional systems. In this example, four solar panels are implemented in each short-string, for example, solar panels 505a-505d. Each of these solar panels absorb solar energy and convert the solar energy into direct current electricity at a particular voltage. In a series electrical connection of solar panels 505a-505d, the voltages produced by each of solar panels 505a-505d sum together to create a higher voltage than could be obtained by one solar panel alone. This is advantageous because the higher voltage provided by series connected solar panels 505a-505d to short-string optimizer 520a provides a smaller voltage boost ratio and efficient conversion to the higher voltage of direct current bus 510. This configuration further simplifies converter design and operation and is also more straightforward in terms of necessary circuitry to implement short-string optimizer 520a.

For example, when connected in a series electrical connection, solar panels 505a-505d may produce direct current electricity between 0 and approximately 200 volts depending on weather conditions. On average, solar panels 505a-505d may produce approximately 120 volts of direct current electricity under typical conditions when connected in a series electrical connection. This is advantageous because 120 volts of direct current electricity is closer to the higher voltage of direct current bus 510. For example, if direct current bus 510 is intended to operate at 175 volts, for example, the conversion ratio for short-string optimizer 520a is closer to 1:1. Given that an ideal conversion ratio is in the vicinity of 1:1, photovoltaic system 500 enjoys a more efficient direct current to direct current conversion within short-string optimizer 520a.

In addition to providing a better direct current to direct current conversion ratio, photovoltaic system 500 provides additional advantages. First, because short-string optimizers 520a-520n are connected in a parallel electrical connection, the direct current electricity output by each of short-string optimizers 520a-520n is aggregated into a higher current level at the same voltage for direct current bus 510. Second, all of the direct current electricity output by short-string optimizers 520a-520n is inverted by inverter 515 in one high power inversion as opposed to inverting multiple smaller portions of the direct current electricity at different points in a system. Performing a single high power inversion is both more energy efficient (results in fewer electrical losses) and is more cost-effective on a per-watt basis than performing multiple smaller electrical inversions that would equal, in aggregate, the same overall level of inverted power. Thus, by implementing a series electrical connection for solar panels 505a-505n with their respective short-string optimizers 520a-520n and by implementing a parallel electrical connection between short-string optimizers, photovoltaic system 500 provides a high level of efficiency while reducing the complexity of the system as a whole.

It is to be noted that a short-string of solar panels within photovoltaic system 500 may be installed on a rooftop at a sub-optimal angle as referenced to the sun. However, so long as each of the solar panels in the short-string of solar panels experience substantially similar solar conditions, the short-string optimizer will still maximize the available energy from the short-string of solar panels, without one solar panel sub-optimizing the other, and at a high level of efficiency. That is to say, so long as the elevation angle and azimuth angle for each solar panel in a short-string of solar panels is consistent for each solar panel in the short-string, the system will still maximize the available solar energy and maintain a high level of efficiency. Thus, so long as both the elevation angle and azimuth angle is consistent for each solar panel within a short-string of solar panels, the elevation angles and/or azimuth angles of other short-strings within the system can differ from string to string. Thus, short-strings of solar panels may be positioned on different portions of rooftops with different pitches and still efficiently generate electrical power.

Finally, with respect to FIG. 5, photovoltaic system 500 further implements fewer overall devices per solar panel than many conventional photovoltaic systems. The devices within photovoltaic system 500 are also much less electrically complicated than conventional devices in at least some conventional photovoltaic systems. These improvements reduce the overall financial cost to users of photovoltaic system 500 and provide fewer points for system failure. Thus, photovoltaic system 500 is more robust and reliable than many conventional photovoltaic systems.

Figure 6:
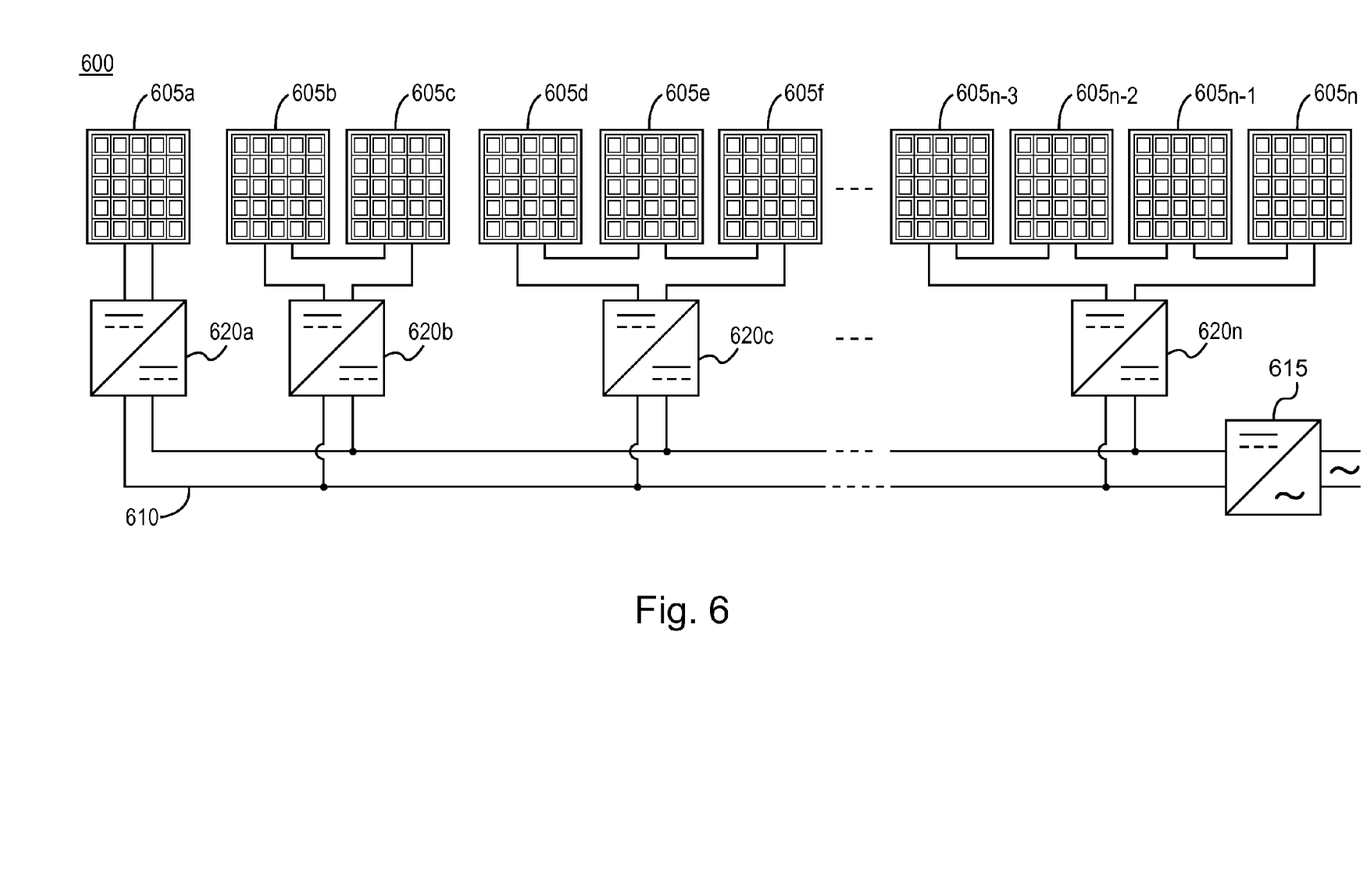
FIG. 6 illustrates another embodiment of an optimized short-string topology photovoltaic system.

FIG. 6 demonstrates an alternate embodiment of photovoltaic system 500 shown in FIG. 5 and is referred to as photovoltaic system 600. Photovoltaic system 600 includes a plurality of solar panels 605a, 605b, 605c, 605d, 605e, 605f, 605n-3, 605n-2, 605n-1, and 605n. For purposes of discussion, solar panels 605a-605n are organized into a single solar panel implementation and at least three short-strings of two, three, and up to four solar panels each, as shown in FIG. 6. However, as discussed above, this is a specific non-limiting embodiment that demonstrates the flexibility of photovoltaic system 500 shown in FIG. 5 using different numbers of solar panels to create multiple short-strings. This disclosure contemplates any number of short-strings each of which include a plurality of solar panels, as discussed above.

Photovoltaic system 600 connects solar panel 605a directly to short-string optimizer 620a in order to provide additional flexibility to photovoltaic system 600. Solar panel 605a is not, in this case, connected in a short-string of solar panels. However, short-string optimizer 620a may be used with a single solar panel if such an implementation is desirable for a particular installation. For example, if a particular homeowner requests the ability to monitor solar energy production on a per-panel basis, a short-string optimizer can be provided for each individual solar panel. A single solar panel such as solar panel 605a and a single short-string optimizer 620a may also be desirable if portions of solar panel 605a are shaded by a solar obstruction, such as a rooftop mounted satellite dish, for at least a portion of a day. In such an implementation, the solar panel, such as solar panel 605a, will operate at a maximum production level when the solar panel is not shaded by a solar obstruction. The solar panel, such as solar panel 605a, will also operate at a maximum power production level, based on the illumination conditions experienced by the solar panel during the portion of the day in which solar panel 605a is shaded. However, the maximum power production level for the solar panel, such as solar panel 605a, when shaded will be less than the maximum power production level for the solar panel when the solar panel is not shaded by a solar obstruction.

Since solar panel 605a is not, in this implementation, part of a short-string of solar panels, solar panel 605a will not reduce the capacity, production, or effectiveness of other solar panels in photovoltaic system 600. Thus, solar panel 605a may be implemented singly with short-string optimizer 620a to harvest solar energy in portions of rooftops that are shaded during some portions of the day and unshaded during other portions of the day without reducing the effectiveness of an entire string of solar panels. More simply, single solar panel 605a and short-string optimizer 620a provide photovoltaic system 600 the ability to harvest solar energy in portions of rooftops that are occasionally subject to shading without reducing the effectiveness of any other solar panel in the system while solar panel 605a is shaded, maximizing the available rooftop space for energy production. Solar panel 605a can also be placed at an azimuth angle and an elevation angle that is different from other solar panels in photovoltaic system 600 without affecting the power generation abilities of other solar panels in photovoltaic system 600.

Short-string optimizer 620a is connected to other short-string optimizers 620b, 620c, to 620n in a parallel electrical connection by direct current bus 610. Direct current bus 610 further connects short-string optimizers 620a-620n to inverter 615. Thus, each of short-string optimizers 620a-620n contribute direct current electricity to direct current bus 610 to be inverted into alternating current electricity by inverter 615.

Photovoltaic system 600 further provides, in this instructive implementation, solar panels 605b and 605c, connected in a series electrical connection to short-string optimizer 620b. In this implementation, the voltage of the direct current electricity provided by solar panels 605b and 605c is aggregated because solar panels 605b and 605c are connected in a series electrical connection. While solar panels 605b and 605c do not produce as high of a voltage as, for example, solar panels 605n-3-605n, solar panels 605b and 605c also fit in half of the space required for solar panels 605n-3-605n. Thus, in this particular implementation, solar panels 605b and 605c may be positioned on a portion of a rooftop where a traditional long string, or even a larger short-string, of solar panels would not fit. Accordingly, solar panels 605b and 605c allow for solar energy to be harvested in an area of a rooftop that would be inaccessible for a traditional string of solar panels. Furthermore, even if a technical failure occurs in photovoltaic system 600, only the short-string in which the failure occurs will be affected by the technical failure because each short-string is isolated from other short-strings in photovoltaic system 600 by the parallel electrical connections of short-string optimizers 620a-620n to direct current bus 610.

Photovoltaic system 600 further provides, in this instructive implementation, solar panels 605d-605f, connected in a series electrical connection to short-string optimizer 620c. Solar panels 605d-605f, like solar panels 605b and 605c, provide an ability to further maximize solar energy production by using previously unavailable portions of a rooftop. In this implementation, solar panels 605d-605f fit in available rooftop space. Solar panels 605d-605f in photovoltaic system 600 are connected in a series electrical connection and therefore the voltage of the direct current electricity provided by solar panels 605d-605f is aggregated in a manner similar to that discussed above with respect to solar panels 605b and 605c.

Finally, photovoltaic system 600 provides solar panels 605n-3-605n which are connected in a series electrical connection to short-string optimizer 620n. This short-string of solar panels 605n-3-605n is implemented in a manner similar to solar panels 505a-505d shown in FIG. 5 and discussed above.

It should be noted that between two and four solar panels may be implemented in a short-string depending on the characteristics of a specific rooftop. It should also be noted that any number of short-strings may be implemented in one photovoltaic system. Photovoltaic system 600 demonstrates the flexibility and scalability of short-strings for power generation. The flexibility provided by photovoltaic system 600 allows system installers to use previously unusable portions of rooftops, as compared with a traditional string topology.

Figure 7:
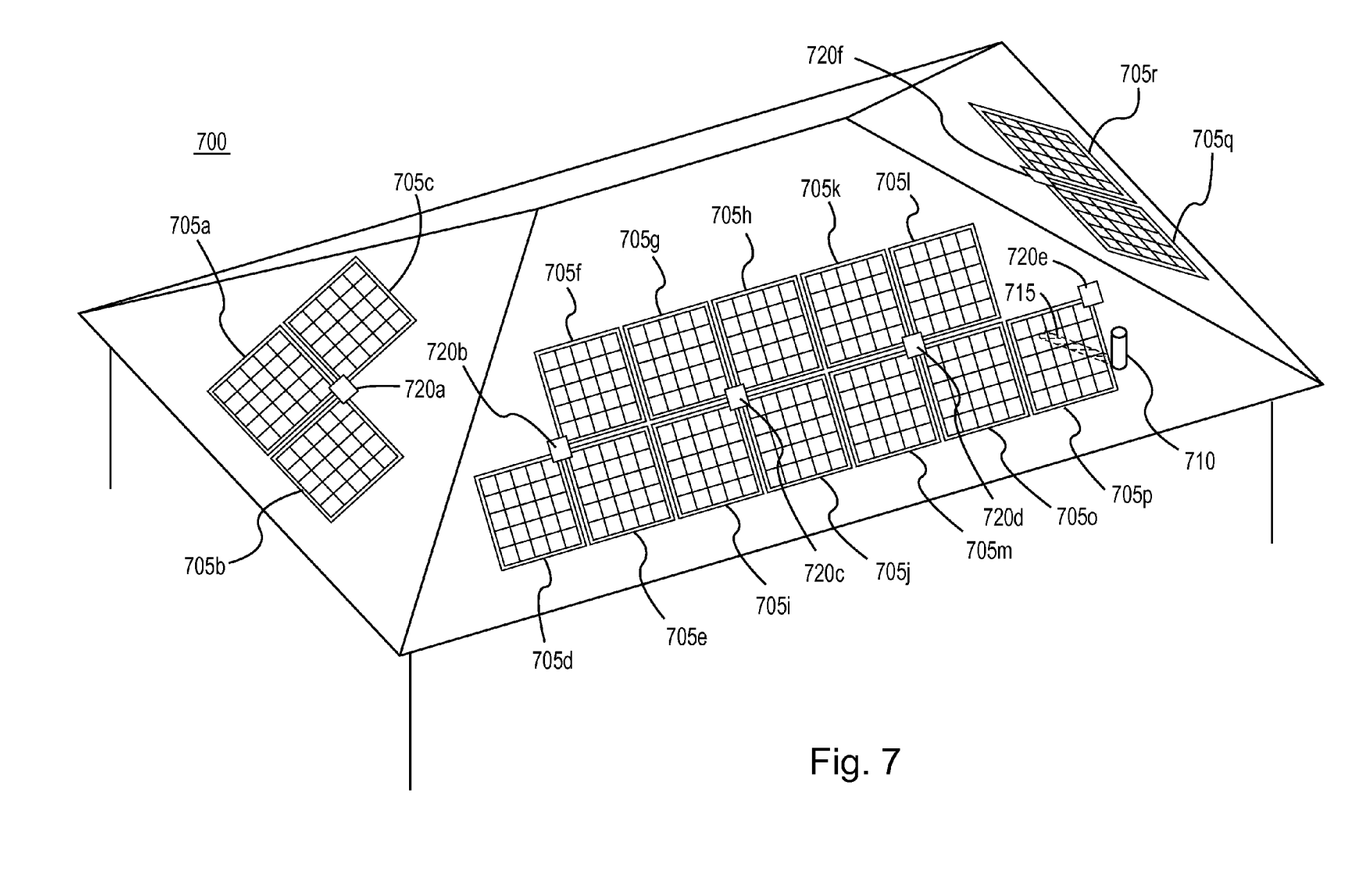
FIG. 7 illustrates an exemplary flexible rooftop implementation of an optimized short-string photovoltaic system.

FIG. 7 illustrates an exemplary flexible rooftop implementation of an optimized short-string photovoltaic system 700. Photovoltaic system 700 includes solar panels 705a, 705b, and 705c which are connected in a series electrical connection to short-string optimizer 720a. Similarly, solar panels 705d, 705e, and 705f are connected in a series electrical connection and to short-string optimizer 720b; solar panels 705g, 705h, 705i, and 705j are connected in a series electrical connection and to short-string optimizer 720c; solar panels 705k, 705l, 705m, and 705o are connected in a series electrical connection and to short-string optimizer 720d; solar panel 705p is directly connected to short-string optimizer 720e; and solar panels 705q and 705r are connected in a series electrical connection and to short-string optimizer 720f. Essentially, photovoltaic system 700 shows another exemplary implementation of photovoltaic system 500. However, photovoltaic system 700 is a specific implementation for a particular rooftop. As discussed above, in implementation, any number of short-strings of solar panels may be implemented. Photovoltaic system 700 is flexible in that available rooftop space may be maximized to maximize power generation. Thus, each specific implementation for each different rooftop may be different.

FIG. 7 demonstrates an exemplary rooftop on which photovoltaic system 700 is implemented. For purposes of discussion, assume that the exemplary rooftop is located in North America and short-string optimizers 720b, 720c, 720d, and 720e are placed on a south facing portion of the exemplary rooftop. A direct current bus and one or more inverters are included in photovoltaic system 700 but are not shown in FIG. 7.

In photovoltaic system 700, solar panels 705a-705c are implemented in a short-string on a west facing portion of the exemplary rooftop at a consistent azimuth angle and a consistent elevation angle. However, because of the characteristics of the exemplary rooftop (i.e., the west facing portion of the exemplary rooftop is not wide enough between the exemplary rooftop hips for four solar panels), only three solar panels, 705a-705c fit on the west facing portion of the exemplary rooftop. Therefore, only three solar panels 705a-705c are implemented on the west facing portion of the exemplary rooftop. Solar panels 705a-705c are connected in a series electrical connection and to short-string optimizer 720a in a manner similar to that discussed above with respect to solar panels 605d-605f and short-string optimizer 620c, shown in FIG. 6.

On the south facing portion of the exemplary rooftop shown in FIG. 7, solar panels 705g, 705h, 705i, 705j, 705k, 705l, 705m, and 705o are respectively connected to one of short-string optimizers 720c and 720d in a manner similar to that discussed above with respect to solar panels 505a-505d and short-string optimizer 520a shown in FIG. 5, and are installed at an elevation angle that is consistent with each of the other solar panels in the same short-string of solar panels. In FIG. 7, the exemplary rooftop is wide enough to accommodate two short-strings of four solar panels each. However, additional space on the south facing portion of the exemplary rooftop exists which can support some solar panels but fewer than four solar panels. In this case, a short-string of solar panels 705d, 705e, and 705f can be implemented on the south facing portion of the exemplary rooftop. In this example, a roof hip prevents a fourth solar panel from fitting in the available space on the exemplary rooftop. Thus, in order to maximize the usefulness of the available rooftop space, a short-string of three solar panels 705d, 705e, and 705f is connected in a series electrical connection and to short-string optimizer 720b in a manner similar to that discussed above with respect to solar panels 605d-605f and short-string optimizer 620c, shown in FIG. 6.

The exemplary rooftop shown in FIG. 7 further includes a vent stand pipe 710, a solar obstruction, which protrudes out from the surface of the exemplary rooftop. During the day vent stand pipe 710 casts a shadow 715 on to the surrounding rooftop. Shadow 715 moves on the exemplary rooftop as the sun crosses the sky each day shading a portion of the exemplary rooftop. In some conventional systems, this shaded portion of the exemplary rooftop would be sub-optimal for solar panel installation because when shadow 715 is cast on a solar panel, such as solar panel 705p, the shaded solar panel would, in at least some cases, reduce the power generation abilities of other solar panels. However, in photovoltaic system 700, solar panel 705p harvests solar energy available when solar panel 705 is shaded and unshaded without negatively affecting the rest of photovoltaic system 700. Solar panel 705p is directly connected to short-string optimizer 720e. Accordingly, solar panel 705p is implemented in a manner similar to that discussed above with respect to solar panel 605a and short-string optimizer 620a, as shown in FIG. 6.

In this case, even though solar panel 705p is shaded by shadow 715 of vent stand pipe 710 and therefore produces less electricity than would be produced if solar panel 705p was not shaded, the net power production gain because of solar panel 705p is positive. Since a photovoltaic system installer knows that a shadow 715 of vent stand pipe 710 will be cast on in a known semi-shaded area, but knows that the power generation in this area of the roof will still be sufficiently productive and economically viable, the photovoltaic system installer installs solar panel 705p in the semi-shaded area with a dedicated short-string optimizer 720e. In this configuration, because solar panel 705p is not connected in a short-string, solar panel 705p does not reduce the effectiveness of other solar panels that remain unshaded during the day and still contributes positive power gain to photovoltaic system 700 because solar panel 705p harvests more solar energy than could be harvested without solar panel 705p.

On the east facing portion of the exemplary rooftop shown in FIG. 7, solar panels 705r and 705q are connected in a series electrical connection and to short-string optimizer 720f. In photovoltaic system 700, solar panels 705q and 705r are implemented on the east facing portion of the exemplary rooftop at an azimuth angle and an elevation angle that are consistent for both solar panels 705q and 705r. Solar panels 705q and 705r are connected in a series electrical connection and to short-string optimizer 720f in a manner similar to that discussed above with respect to solar panels 605b and 605c and short-string optimizer 620b, shown in FIG. 6.

In this example, a third solar panel would fit on the east facing portion of the exemplary rooftop. However, in this case, a homeowner intends to install a satellite dish, a solar obstruction, on the exemplary rooftop near solar panels 705q and 705r. Thus, a third solar panel would not fit on the east facing portion of the exemplary rooftop. Further, the satellite dish will cause shading to fall on solar panels 705q and 705r at certain times of day and in certain seasons. However, in photovoltaic system 700, any negative effects caused by shading are limited in effect to the short-string consisting of solar panels 705q and 705r.

Thus, as shown in this example, photovoltaic system 700 is flexible enough to implement a scalable and electrically efficient system that maximizes rooftop space and electrical power generation. Photovoltaic system 700 can be designed with any number of short-strings or individual solar panels to reduce or eliminate the impact of solar obstructions on solar panels while maximizing electrical power generation for a given surface area of a rooftop.

Figure 8:
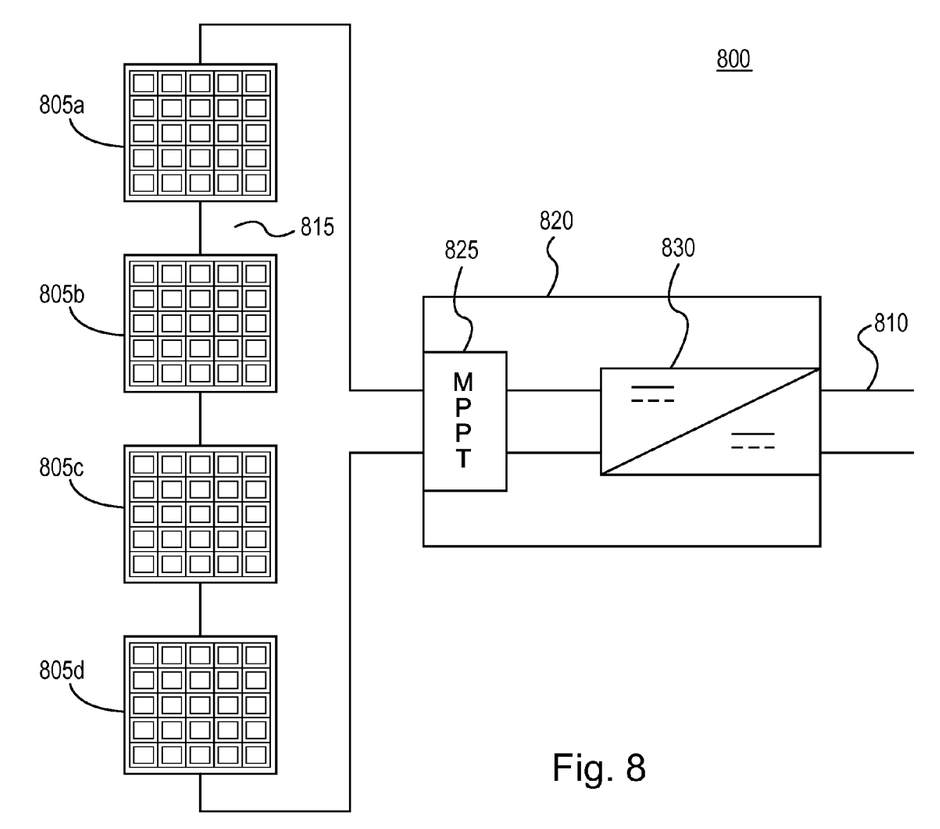
FIG. 8 illustrates a short-string optimizer photovoltaic system.

FIG. 8 illustrates a short-string optimizer system 800. System 800 includes power generators 805a, 805b, 805c, and 805d which are connected to each other using a series electrical connection 815. Power generators 805a-805d are shown in FIG. 8 as solar panels. However, power generators 805a-805d could be implemented as wind turbines, water turbines, other hydropower generators, geothermal generators, or any other renewable energy generator. Power generators 805a-805d could also be implemented using non-renewable energy generators such as a plurality of fuel cells and other chemical fuel based electrical generators.

Power generators 805a-805d are connected to short-string optimizer 820. Short-string optimizer 820 includes an MPPT (maximum power point tracking) circuit 825 and a direct electrical current to direct electrical current converter ("DC to DC converter") 830. MPPT circuit 825 includes electronic components and algorithmic programming for measuring voltage and current produced from a power generator, such as power generators 805a-805d. MPPT circuit 825 may include a combination of one or more application programs and one or more hardware components configured to calculate power generated by a power generator, alter the load impedance presented to that device, and determine the conditions under which maximum power is produced.

For example, MPPT circuit 825 may monitor the voltage and current supplied by power generators 805a-805d. MPPT circuit 825 uses the monitored voltage and current information to periodically and iteratively adjust the maximum power point in order to harvest the maximum power available from power generators 805a-805d. A maximum power point ("MPP") is defined as an operating point wherein the particular voltage and current conditions presently at the output of the solar panel result in the maximum power that can be harvested from the solar panel at that point in time; the power being the product of the voltage supplied to MPPT circuit 825 multiplied by the direct current supplied to MPPT circuit 825. In order to identify the MPP, the MPPT circuit 825 is configured to adjust an internal load impedance within MPPT circuit 825. As the internal load impedance is adjusted the MPP for MPPT circuit 825 is iteratively identified.

Power generators can, in some cases, be inconsistent in the amount of power generated under different conditions. For example, solar panels generate power in proportion to the amount of solar energy available to be absorbed. During periods of dawn and dusk there is relatively less solar energy available to be absorbed than there is available after noon, for example. Thus, the MPP varies according to the amount of solar energy available to be absorbed. While this example is discussed specifically with respect to solar panels, most power generators have periods of lower power generation and higher power generation (wind turbines in periods of high winds and in periods of no wind, for example). Because the MPP can vary, MPPT circuit 825 constantly tracks the MPP and optimizes the load impedance to harvest the most energy available at a particular time.

In one example, application programs used by MPPT circuit 825 may include software modules, sequences of instructions, routines, data structures, display interfaces, and other types of structures that execute computer operations. Further, hardware components may include a combination of Central Processing Units ("CPUs"), buses, volatile and non-volatile memory devices, storage units, non-transitory computer-readable media, data processors, processing devices, control devices transmitters, receivers, antennas, transceivers, input devices, output devices, network interface devices, and other types of components that are apparent to those skilled in the art.

Short-string optimizer 820 further includes DC to DC converter 830. DC to DC converter 830 converts a voltage at one level to a voltage at a higher level. Thus, in the context of short-string optimizer 820, DC to DC converter 830 receives direct current at a certain voltage from power generators 805a-805d via MPPT circuit 825 and increases the voltage to the desired voltage of direct current bus 810. Short-string optimizer 820 outputs direct current at the desired voltage onto direct current bus 810.

The foregoing description has been presented for purposes of illustration. It is not exhaustive and does not limit the invention to the precise forms or embodiments disclosed. Modifications and adaptations will be apparent to those skilled in the art from consideration of the specification and practice of the disclosed embodiments. For example, components described herein may be removed and other components added without departing from the scope or spirit of the embodiments disclosed herein or the appended claims.

Other embodiments will be apparent to those skilled in the art from consideration of the specification and practice of the disclosure disclosed herein. It is intended that the specification and examples be considered as exemplary only, with a true scope and spirit of the invention being indicated by the following claims.

What is claimed is:

1. A system comprising:
    a first plurality of separate solar panels that is connected in a series electrical connection, wherein each one of the separate solar panels in the first plurality of separate solar panels shares a consistent azimuth angle;
    a second plurality of separate solar panels that is connected in a series electrical connection, wherein each one of the separate solar panels in the second plurality of separate solar panels shares a consistent azimuth angle that is different from the azimuth angle of the first plurality of separate solar panels;
    one or more solar panels positioned to be shaded during at least a portion of a day;
    a first short-string optimizer separate from the first plurality of solar panels connected in series with the first plurality of solar panels;
    a second short-string optimizer separate from the second plurality of solar panels connected in series with the second plurality of solar panels; and
    a third short-string optimizer connected in series with the one or more solar panels,
    wherein the first short-string optimizer, the second short-string optimizer, and the third short-string optimizer are connected in parallel and output direct current electricity generated by the first plurality of separate solar panels, the second plurality of solar panels, and the one or more solar panels to a direct current bus.

2. The system of claim 1, wherein the first short-string optimizer, the second-short string optimizer, and the third short string optimizer further comprise an MPPT (maximum power point tracking) circuit.

3. The system of claim 1, wherein the first short-string optimizer, the second-short string optimizer, and the third short string optimizer each further comprise a DC to DC converter.

4. The system of claim 1, wherein the first plurality of solar panels and the second plurality of solar panels each comprises between two and four solar panels.

5. The system of claim 1, wherein the direct current bus is further connected to either a single inverter or to a plurality of inverters connected by a parallel electrical connection.

6. A system comprising:
    a first plurality of separate solar panels that is connected in a series electrical connection and to a first short-string optimizer separate from the first plurality of separate solar panels, wherein the first plurality of separate solar panels in the first plurality of separate solar panels shares a consistent azimuth angle;
    a second plurality of separate solar panels that is connected in a series electrical connection and to a second short-string optimizer separate from the second plurality of separate solar panels, wherein each one of the separate solar panels in the second plurality of solar panels shares a consistent azimuth angle that is different from the azimuth angle of the first plurality of separate solar panels, one or more solar panels positioned to be shaded during at least a portion of a day connected to a third short-string optimizer, wherein the first short-string optimizer, the second short-string optimizer, and the third short-string optimizer are connected in a parallel electrical connection and output direct current electricity generated by the first plurality of solar panels, the second plurality of solar panels and the one or more solar panels to a direct current bus.

7. The system of claim 6, wherein the direct current bus is further connected to either a single inverter or to a plurality of inverters connected by a parallel electrical connection.

8. The system of claim 6, wherein at least one of the first plurality of solar panels or the second plurality of solar panels consists of between two and four solar panels.

9. The system of claim 6, wherein the third short-string optimizer supplies less direct current electricity to the direct current bus than the first short-string optimizer and the second short-string optimizer.

10. The system of claim 9, wherein the third plurality of solar panels includes fewer solar panels than the first plurality of solar panels or the second plurality of solar panels.

11. The system of claim 6, wherein the first plurality of solar panels are positioned at a first elevation angle and the second plurality of solar panels are positioned at a second elevation angle, different from the first elevation angle.

12. The system of claim 6, wherein the first plurality of solar panels are positioned facing a first direction and the second plurality of solar panels are positioned facing another direction, different from the first direction.

\* \* \* \* \*